United States Patent Office 2,772,278
Patented Nov. 27, 1956

2,772,278

MANUFACTURE OF SULFENAMIDES

Albert F. Hardman, Northampton Township, Summit County, Ohio, assignor to The Goodyear Tire & Rubber Company, Akron, Ohio, a corporation of Ohio No Drawing. Application September 23, 1954, Serial No. 458,029

12 Claims. (Cl. 260—306.6)

This invention relates to N,N-diisopropylbenzothiazolesulfenamide and more particularly to a method for preparing this material.

Benzothiazolesulfenamides have become of commercial importance and have found use as lubricating oil additives, fungicides and rubber accelerators. These materials are used as lubricating oil additives to increase the resistance of the oils to oxidation, as fungicides to inhibit or retard the growth of fungi on cotton, wool, leather, etc., and as rubber accelerators to provide delayed action, nonscorching type of acceleration of vulcanization.

It is an object of this invention to provide a commercially acceptable method of preparing a specific benzothiazolesulfenamide, N,N - diisopropylbenzothiazolesulfenamide, which may be used in the above applications.

Various general methods of making sulfenamides have been suggested in the prior art. Some of these methods involve the oxidative condensation of a mercaptan or a disulfide with an amine in aqueous alkaline medium; the oxidative condensation of a mercaptan or disulfide with an amine in aqueous medium in the presence of an alkali metal sulfate such as sodium sulfate; or the reaction of a metal, ammonium, or amine salt of a mercaptan with an N-chloro secondary amine in water or an organic solvent. These methods produce satisfactory yields of most sulfenamides, but it has been found that N,N-diisopropyl-2-benzothiazolesulfenamide cannot be prepared in satisfactory yields by these methods of the prior art.

According to this invention N,N-diisopropyl-2-benzothiazolesulfenamide can be prepared in a high state of purity and in good yield by reacting 2,2'-bisbenzothiazyldisulfide with N-chlorodiisopropylamine and diisopropylamine, in an organic solvent. The reactants are most efficiently used when they are employed in the proportion of one mol of disulfide, at least one mol of the N-chloroamine and at least two mols of the secondary amine. The progress of the reaction is accelerated if a slight excess of the N-chloroamine and the amine is used.

The reactions taking place are represented by the following equation:

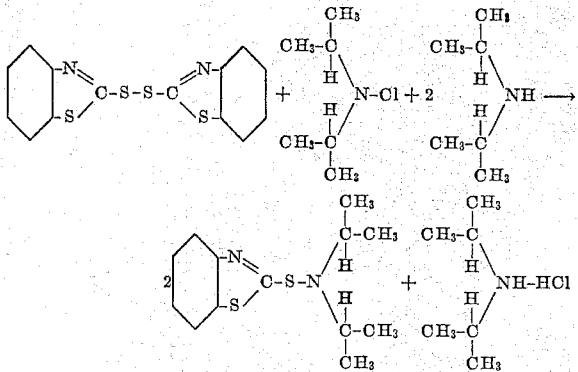

The following example is given to illustrate the practice of the invention:

Example

Thirty-four grams of 2,2'-bisbenzothiazyldisulfide, 50 milliliters of methanol, 21 grams of diisopropylamine and 15 grams of N-chlorodiisopropylamine were placed in a 1-liter 3-neck flask equipped with a stirrer and a reflux condenser. The mixture was stirred and heated to refluxing temperature on a steam bath for 30 minutes. The mixture was then cooled and stirred in an ice bath to crystallize the product. Two hundred to 300 milliliters of cold water were added and the crystals were filtered off, washed with cold water and dried. A 99% yield based on the 2,2'-bisbenzothiazyldisulfide was obtained.

The example illustrates the invention using methanol as the solvent, but other inert organic solvents which do not enter into the reaction can also be used. It has been found that the water content must be low in order to obtain high yields of the desired product. For example, by using methanol containing less than 1% by weight of water yields of 95 to 98% were obtained; by using methanol containing 10% by weight of water the yield was reduced to 60%; by using methanol containing 20% by weight of water the yield was only 37.5%. The solvent should not contain more than 10% and, preferably, not more than 5% by weight of water. Still more preferred is the use of a substantially anhydrous solvent. Other representative solvents that can be used in practicing this invention are aliphatic alcohols such as ethanol, isopropanol, normal propanol, isobutanol, secondary butanol and normal butanol and benzene, toluene, xylene, diethyl ether and dioxane.

The example shows the preparation of the material at the refluxing temperature of the mixture. Lower temperatures can be used, but the reaction time must then be increased accordingly. The temperature is not critical. It is, of course, desirable to use a temperature that is high enough to get a practical rate of reaction and low enough to avoid decomposition.

Instead of purifying the material by crystallization, other methods can be used, if desired.

While certain representative embodiments and details have been shown for the purpose of illustrating the invention, it will be apparent to those skilled in this art that various changes and modifications may be made therein without departing from the spirit or scope of the invention.

I claim:

1. The process of preparing N,N-diisopropyl-2-benzothiazolesulfenamide which comprises reacting in an inert organic solvent one mol of 2,2'-bis benzothiazyldisulfide, one mol of N-chlorodiisopropylamine and two mols of diisopropylamine, said solvent containing not more than 10% by weight of water.

2. The process of preparing N,N-diisopropyl-2-benzothiazolesulfenamide which comprises reacting in an inert organic solvent one mol of 2,2'-bis benzothiazyldisulfide, one mol of N-chlorodiisopropylamine and two mols of diisopropylamine, said solvent containing not more than 5% by weight of water.

3. The process of preparing N,N-diisopropyl-2-benzothiazolesulfenamide which comprises reacting in an inert organic solvent one mol of 2,2'-bis benzothiazyldisulfide, one mol of N-chlorodiisopropylamine and two mols of diisopropylamine, said solvent containing not more than 1% by weight of water.

4. The process of preparing N,N-diisopropyl-2-benzothiazolesulfenamide which comprises reacting, in a substantially anhydrous inert organic solvent, one mol of 2,2'-bis benzothiazyldisulfide, one mol of N-chlorodiisopropylamine and two mols of diisopropylamine.

5. The process of preparing N,N-diisopropyl-2-benzothiazolesulfenamide which comprises reacting in an inert organic solvent one mol of 2,2'-bis benzothiazyldisulfide, one mol of N-chlorodiisopropylamine and two mols of diisopropylamine, said solvent being selected from the group consisting of methanol, ethanol, isopropanol, normal propanol, isobutanol, secondary butanol, normal butanol, benzene, toluene, xylene and diethyl ether, said solvent containing not more than 10% by weight of water.

6. The process of preparing N,N-diisopropyl-2-benzothiazolesulfenamide which comprises reacting in an inert organic solvent one mol of 2,2'-bis benzothiazyldisulfide, one mol of N-chlorodiisopropylamine and two mols of diisopropylamine, said solvent being selected from the group consisting of methanol, ethanol, isopropanol, normal propanol, isobutanol, secondary butanol, normal butanol, benzene, toluene, xylene and diethyl ether, said solvent containing not more than 1% by weight of water.

7. The process of preparing N,N-diisopropyl-2-benzothiazolesulfenamide which comprises reacting in an inert organic solvent one mol of 2,2'-bis benzothiazyldisulfide, one mol of N-chlorodiisopropylamine and two mols of diisopropylamine, said solvent being selected from the group consisting of methanol, ethanol, isopropanol, normal propanol, isobutanol, secondary butanol, normal butanol, benzene, toluene, xylene and diethyl ether, said solvent containing not more than 5% by weight of water.

8. The process of preparing N,N-diisopropyl-2-benzothiazolesulfenamide which comprises reacting in an inert organic solvent one mol of 2,2'-bis benzothiazyldisulfide, one mol of N-chlorodiisopropylamine and two mols of diisopropylamine, said solvent being selected from the group consisting of methanol, ethanol, isopropanol, normal propanol, isobutanol, secondary butanol, normal butanol, benzene, toluene, xylene and diethyl ether, said solvent being substantially anhydrous.

9. The process of preparing N,N-diisopropyl-2-benzothiazolesulfenamide which comprises reacting 1 mol of 2,2'-bis benzothiazyldisulfide, 1 mol of N-chlorodiisopropylamine and 2 mols of diisopropylamine, the reaction being carried out in methanol, said methanol containing not more than 10% by weight of water.

10. The process of preparing N,N-diisopropyl-2-benzothiazolesulfenamide which comprises reacting 1 mol of 2,2'-bis benzothiazyldisulfide, 1 mol of N-chlorodiisopropylamine and 2 mols of diisopropylamine, the reaction being carried out in methanol, said methanol containing not more than 5% by weight of water.

11. The process of preparing N,N-diisopropyl-2-benzothiazolesulfenamide which comprises reacting 1 mol of 2,2'-bis benzothiazyldisulfide, 1 mol of N-chlorodiisopropylamine and 2 mols of diisopropylamine, the reaction being carried out in methanol, said methanol containing not more than 1% by weight of water.

12. The process of preparing N,N-diisopropyl-2-benzothiazolesulfenamide which comprises reacting 1 mol of 2,2'-bis benzothiazyldisulfide, 1 mol of N-chlorodiisopropylamine and 2 mols of diisopropylamine, the reaction being carried out in substantially anhydrous methanol.

References Cited in the file of this patent

UNITED STATES PATENTS

| | | |
|---|---|---|
| 2,045,888 | Tschunkur et al. | June 30, 1936 |
| 2,226,767 | Harman | Dec. 31, 1940 |
| 2,354,427 | Carr | July 25, 1944 |
| 2,382,793 | Howland | Aug. 14, 1945 |
| 2,495,085 | Alliger | Jan. 17, 1950 |

FOREIGN PATENTS

| | | |
|---|---|---|
| 185,342 | Switzerland | Oct. 1, 1936 |